O. T. BLÁTHY.
METHOD FOR ADJUSTING ELECTRIC METERS.
APPLICATION FILED MAR. 2, 1915.
1,199,150.  Patented Sept. 26, 1916.
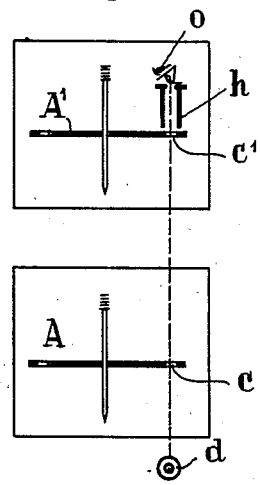
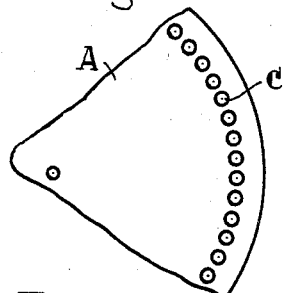
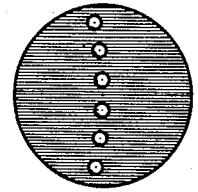
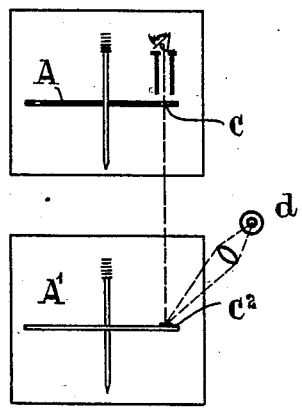
WITNESSES
INVENTOR
O. T. BLÁTHY
BY
ATTORNEY

UNITED STATES PATENT OFFICE.

OTTO TITUS BLÁTHY, OF BUDAPEST, AUSTRIA-HUNGARY.

METHOD FOR ADJUSTING ELECTRIC METERS.

1,199,150.  Specification of Letters Patent.  Patented Sept. 26, 1916.

Application filed March 2, 1915. Serial No. 11,651.

*To all whom it may concern:*

Be it known that I, OTTO TITUS BLÁTHY, a subject of the King of Hungary, residing at Budapest, Austria-Hungary, have invented certain new and useful Improvements in Methods for Adjusting Electric Meters, of which the following is a specification.

My invention relates to a method for adjusting electric current meters with rotating disks or armatures according to a normal meter and allows to attain quickly and reliably the synchronism of the meters to be compared, so that the adjusting of the meters, especially with the method set forth in my patent application Serial Number 877419 can be effected in few seconds with great exactitude.

My method consists in uniting the images of marks provided on the rotating part, especially on the disk of the meter, observed in transmitted or reflected light, into one field of view in such a manner, that the differences of velocity of the images falling into the same optical axis may be perceived by direct observation.

According to my method the meter disk is provided most preferably near to its circumference with equidistant marks which are observed through a diaphragm rotating with the rotating part of the other meter, the apertures of said diaphragm being arranged in such a manner with respect to the marks to be observed of the first meter, that a stroboscopical effect takes place.

With reference to Figure 1 of the annexed diagrammatic drawing, A and A' respectively are the braking or rotating disks of the two meters to be compared with each other. These disks are disposed coaxially one above the other in such a manner, that the eye —o— looking through the tube —h— limiting a field of view and through the coinciding apertures —c— and —c'— of the two disks A and A' will see the light source —d—. The disks A and A' of the two meters are provided near to their respective circumference with a file of equidistant apertures —c— as shown in Fig. 2 representing a part of such meter disk. In the field of view of the tube —h— there appears a row of illuminated dots (Fig. 3) on dark background. The disk A' serving as rotating diaphragm produces on the disk A serving as rotating picture disk a stroboscopical effect in such a manner, that if both meters are running with the same speed, the row of dots appears to be stationary in the field of view of the observing tube, while if the two disks run with different speeds, the row of dots travels in the one or the other direction according to the lag or leading of the meter to be adjusted with respect to the normal meter. The one or the other of the two meters may be the normal meter.

In adjusting a meter, there will be seen in the observing tube at first generally a moving row of dots whereupon the speed of the meter to be adjusted will be varied gradually (for instance by turning the screw —x— shown in my patent application Ser. No. 877419) until the row of dots will become stationary in the field of view of the observing tube. With some practice this may be attained in few seconds with the greatest accuracy required.

In the case above described, the marks provided on the meter disks viz. the apertures —c— will be observed in transmitted light. However instead of transparent marks, the disk of the normal meter or of the meter to be adjusted may be provided with marks to be observed in reflected light. Fig. 4 shows for instance an arrangement according to which on the lower face of the disk A' of the meter to be adjusted is printed a chaplet of white dots $c^2$ on black background. This chaplet is illuminated by a lamp —d— and will be observed through the telescope —k—, the row of apertures —c— of the disk A serving as revolving diaphragm. The image appearing in the telescope is substantially the same as in the former case (Fig. 3).

By choosing suitably the distance of the apertures —c— on the disk A' and the distance of the spindles of the two meters, it can be attained, that the image of the apertures projected to the screen —s— will be stationary if both meters are running with exactly the same speed.

What I claim is:

1. A process of adjusting rotary meters, said process consisting in placing said rotary parts coaxial; and viewing marks circumferentially arranged in series on one rotary part through similarly arranged apertures on the other rotary part; and adjusting one of said meters until said marks appear stationary.

2. A testing set comprising a pair of coaxial rotary parts, one of which is provided with a series of circumferentially arranged holes, the other rotary part being provided with similarly arranged marks.

3. A testing set comprising a pair of coaxial rotary parts, one of which is provided with a series of circumferentially arranged holes, the other rotary part being provided with similarly arranged marks; and means for viewing said marks through said apertures.

4. A testing set comprising a pair of coaxial rotary parts, one of which is provided with a series of circumferentially arranged holes, the other rotary part being provided with similarly arranged marks; and a telescope for viewing said marks through said apertures.

5. A testing set comprising a pair of coaxial rotary parts, one of which is provided with a series of circumferentially arranged holes, the other rotary part being provided with similarly arranged marks; and means for illuminating said marks.

6. A testing set comprising a pair of coaxial rotary parts, one of which is provided with a series of circumferentially arranged holes, the other rotary part being provided with similarly arranged marks; a telescope for viewing said marks through said apertures and means for illuminating said marks.

In witness whereof I have hereunto set my hand in the presence of two witnesses.

OTTO TITUS BLÁTHY.

Witnesses:
 EUGENE HARSANY,
 ROTHEN SCHMITZ.